United States Patent Office.

ADOLPHUS ISIDOR RATH, OF HYDE, ENGLAND.

MANUFACTURE OF INDIA-RUBBER.

SPECIFICATION forming part of Letters Patent No. 468,627, dated February 9, 1892.
Application filed July 24, 1891. Serial No. 400,541. (No specimens.) Patented in England June 20, 1891, No. 10,524.

*To all whom it may concern:*

Be it known that I, ADOLPHUS ISIDOR RATH, a subject of the Queen of Great Britain and Ireland, and residing at Hyde, in the county of Chester, England, have invented an Improvement in the Manufacture of India-Rubber, (for which I have applied for British patent, dated June 20, 1891, No. 10,524,) of which the following is a specification.

The object of this invention is to impart to india-rubber during the process of its manufacture greater toughness, strength, and durability, whereby its value is increased, its qualities improved, and it is rendered especially applicable to a variety of useful purposes to which india-rubber prepared or manufactured in the ordinary manner and possessing these qualities only in a modified degree is not so advantageously applicable.

My invention consists, mainly, in imparting these desirable qualities to the india-rubber by the admixture therewith during the process of its manufacture and while in the state known as "dough" of a small proportion of fiber of waste silk, as hereinafter described, which will be found to impart a strength, resiliency, toughness, and durability to the india-rubber which it would not otherwise possess.

India-rubber manufactured according to my invention is especially suitable for the protecting covering of the india-rubber tubular tire known as "pneumatic tires" and applied to the wheels of bicycles and other velocipedes. It is also applicable to the manufacture of what are known as "cushion-tires" and solid tires used for cycles, owing to its increased strength and durability, as well as on account of its peculiar non-slipping quality, whereby the side slipping of the wheel is prevented. It is also particularly applicable to what are known as "noiseless tires" for cabs and other vehicles, and for an almost endless variety of other uses where the peculiar elastic qualities of india-rubber are required to be combined with increased resiliency, toughness, strength, and durability.

For the purposes of my invention I take waste silk and I grind it by means of grinding-rollers or otherwise into a state of dust or fluff consisting of extremely short fibers, or I reduce the silk waste to a like condition by cutting or other available or known means which will produce the same effect, and add a proportion of this silk waste so ground, reduced, or cut to the dough of india-rubber, and work it well into the dough with the sulphur and other usual ingredient in the ordinary mixing-machine until it is thoroughly incorporated with the rubber and evenly distributed throughout the whole mass.

The quantity of silk waste required to give the requisite qualities to the rubber will vary according to the purpose for which the material is to be used and to the treatment to which it is to undergo; but, for example, I may say that for making tubular or solid tires for cycles about six ounces of silk to twenty-eight pounds of rubber will be found to be a suitable proportion, while for covering pneumatic tires or for making the "treads" of noiseless tires for cabs or other carriages, which are subject to an increased amount of wear and tear, a proportionately increased amount of the silk might be employed with advantage to the same quantity of rubber.

I claim as my invention—

The herein-described composition of matter, consisting of india-rubber mixed with finely-reduced silk fiber.

In testimony whereof I have signed my name to this specification in the presence of two subscribing witnesses.

ADOLPHUS ISIDOR RATH.

Witnesses:
CHARLES A. DAVIES,
JNO. HUGHES.